US009073637B2

(12) United States Patent
Ohtomo et al.

(10) Patent No.: US 9,073,637 B2
(45) Date of Patent: Jul. 7, 2015

(54) FLYING VEHICLE GUIDING SYSTEM AND FLYING VEHICLE GUIDING METHOD

(71) Applicant: Kabushiki Kaisha TOPCON, Tokyo-to (JP)

(72) Inventors: Fumio Ohtomo, Saitama (JP); Kaoru Kumagai, Tokyo-to (JP); Kazuki Osaragi, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/297,869

(22) Filed: Jun. 6, 2014

(65) Prior Publication Data

US 2014/0371952 A1    Dec. 18, 2014

(30) Foreign Application Priority Data

Jun. 14, 2013    (JP) ................................. 2013-126100

(51) Int. Cl.
*B64C 39/02* (2006.01)
*G05D 1/10* (2006.01)

(52) U.S. Cl.
CPC .............. *B64C 39/024* (2013.01); *G05D 1/101* (2013.01)

(58) Field of Classification Search
USPC ............................................................ 701/2
See application file for complete search history.

(56) References Cited

U.S. PATENT DOCUMENTS

| 6,732,051 | B1* | 5/2004 | Kirk et al. ..................... 701/472 |
| 7,804,996 | B2 | 9/2010 | Ohtomo et al. |
| 7,982,665 | B2 | 7/2011 | Kumagai et al. |
| 8,265,817 | B2* | 9/2012 | Tener et al. ..................... 701/23 |

(Continued)

FOREIGN PATENT DOCUMENTS

| EP | 2511781 A1 | 10/2012 |
| JP | 5-118850 A | 5/1993 |

(Continued)

OTHER PUBLICATIONS

European communication mailed Feb. 6, 2015 in corresponding European patent application No. 14171346.1.

(Continued)

*Primary Examiner* — Thomas Tarcza
*Assistant Examiner* — Alex C Dunn
(74) *Attorney, Agent, or Firm* — Nields, Lemack & Frame, LLC (57) ABSTRACT

A flying vehicle guiding system comprises a remotely controllable flying vehicle system, a surveying instrument able to measure distance, angle, and track, and a ground base station for controlling a flight of the flying vehicle system based on measuring results by the surveying instrument. The flying vehicle system has a retro-reflector. The surveying instrument has a non-prism surveying function for performing distance measurement and angle measurement without a retro-reflector, a prism surveying function for performing distance measurement and angle measurement with respect to the retro-reflector, and a tracking function for tracking the retro-reflector and for performing distance measurement and angle measurement. The surveying instrument performs non-prism measurement on a scheduled flight area. The ground base station sets a safe flight area based on the results of the non-prism measurement, and controls so that the flying vehicle system flies in the safe flight area based on the results of tracking measurement.

12 Claims, 10 Drawing Sheets

(56) References Cited

U.S. PATENT DOCUMENTS

| | | | |
|---|---|---|---|
| 8,736,819 B2* | 5/2014 | Nagai | 356/5.01 |
| 2002/0185618 A1* | 12/2002 | Ohishi et al. | 250/559.38 |
| 2004/0246461 A1* | 12/2004 | Ohtomo et al. | 356/4.01 |
| 2005/0286760 A1 | 12/2005 | Ohtomo et al. | |
| 2006/0271263 A1* | 11/2006 | Self et al. | 701/50 |
| 2010/0033371 A1 | 2/2010 | Kumagai et al. | |
| 2012/0114229 A1* | 5/2012 | Zhou | 382/164 |
| 2012/0190386 A1* | 7/2012 | Anderson | 455/456.3 |
| 2012/0320195 A1* | 12/2012 | Tener et al. | 348/139 |
| 2012/0320203 A1* | 12/2012 | Liu | 348/144 |
| 2014/0210663 A1* | 7/2014 | Metzler | 342/357.34 |
| 2014/0240498 A1 | 8/2014 | Ohtomo et al. | |

FOREIGN PATENT DOCUMENTS

| | | |
|---|---|---|
| JP | 8-285588 A | 11/1996 |
| JP | 2002-6424 A | 1/2002 |
| JP | 2006-10376 A | 1/2006 |
| JP | 2010-38822 A | 2/2010 |
| WO | 2008/124713 A2 | 10/2008 |
| WO | 2012/049438 A1 | 4/2012 |

OTHER PUBLICATIONS

IEEE, Proceedings of SICE Annual Conference 2010, Aug. 18-21, 2010, "Control System Design for Visual Based Indoor Inspection Helicopter", pp. 811-816, Higuchi, et al.

* cited by examiner

FLYING VEHICLE GUIDING SYSTEM AND FLYING VEHICLE GUIDING METHOD

BACKGROUND OF THE INVENTION

The present invention relates to a flying vehicle guiding system and a flying vehicle guiding method for remote controlling a small type unmanned air vehicle (UAV: Unmanned Air Vehicle).

In recent years, with progress of UAV (Unmanned Air Vehicle), various types of apparatuses are installed on the UAV, and operations as required are performed by remote control or automatic flight. For instance, a camera for photogrammetry is installed on the UAV and a photograph is taken from a high position or at the place where no operator can gain access, and photogrammetry can be carried out by using acquired photographs.

When carrying out a remote control operation, it is necessary to perform measurement at the present position of the UAV in real time, and normally, a GPS (global positioning system) is installed on the UAV, and the position of the UAV is determined by the GPS.

However, since a GPS is configured so as to measure a position based on signals given off from a plurality of satellites, at a place where the signals from the satellite cannot be received such as the space between buildings, or in tunnels, etc., the position cannot be determined by the GPS, and it was not possible to fly the UAV.

SUMMARY OF THE INVENTION

It is an object of the present invention to provide a flying vehicle guiding system and a flying vehicle guiding method by which it is possible to perform remote-control operation of the UAV at a place or an environmental condition where the GPS cannot be used.

To attain the object as described above, a flying vehicle guiding system according to the present invention comprises a remotely controllable flying vehicle system, a surveying instrument being able to measure distance, angle, and track, and a ground base station for controlling a flight of the flying vehicle system based on measuring results by the surveying instrument, wherein the flying vehicle system has a retro-reflector as an object to be measured, wherein the surveying instrument has a non-prism surveying function for performing distance measurement and angle measurement without a retro-reflector, a prism surveying function for performing distance measurement and angle measurement with respect to the retro-reflector, and a tracking function for tracking the retro-reflector and for performing distance measurement and angle measurement, wherein the surveying instrument performs non-prism measurement on a scheduled flight area, the ground base station sets a safe flight area based on the results of the non-prism measurement, and controls so that the flying vehicle system flies in the safe flight area based on the results of tracking measurement by the surveying instrument.

Further, in the flying vehicle guiding system according to the present invention, the surveying instrument acquires the results of measurement as polar coordinates of a distance and a directional angle, and the ground base station controls the flying vehicle system based on the polar coordinates.

Further, in the flying vehicle guiding system according to the present invention, the flying vehicle system comprises a GPS unit, wherein the ground base station controls the flight of the flying vehicle system based on either a positional information of the flying vehicle system acquired by the surveying instrument or a positional information of the flying vehicle system acquired by the GPS unit.

Further, in the flying vehicle guiding system according to the present invention, two or more of the surveying instruments are set place at different positions, wherein the ground base station commonly owns measurement results of the flying vehicle system by two or more of the surveying instruments, wherein the flight of the flying vehicle system is controlled based on a measurement data by the surveying instruments set place at positions where the surveying instruments can measure the flying vehicle system.

Further, in the flying vehicle guiding system according to the present invention, the ground base station converts a polar coordinate data from the surveying instrument to an orthogonal coordinate data measured by the GPS unit, and controls the flight of the flying vehicle system based on the orthogonal coordinate data.

Further, in the flying vehicle guiding system according to the present invention, the flying vehicle system comprises a camera tiltably supported in an arbitrary direction via a gimbal, and the retro-reflector tilted integrally with the camera and provided in a relation already known with the camera.

Furthermore, a flying vehicle guiding method according to the present invention, uses a remotely controllable flying vehicle system, and a surveying instrument which can perform a non-prism measurement and a tracking measurement, wherein the flying vehicle guiding method comprises a step of measuring the flight area by non-prism measurement in advance, a step of setting a safe flight area based on the results of preliminary measurement, and a step of remotely controlling the flying vehicle system so as to fly within the safe flight area.

According to the present invention, the flying vehicle guiding system comprises a remotely controllable flying vehicle system, a surveying instrument being able to measure distance, angle, and track, and a ground base station for controlling a flight of the flying vehicle system based on measuring results by the surveying instrument, wherein the flying vehicle system has a retro-reflector as an object to be measured, wherein the surveying instrument has a non-prism surveying function for performing distance measurement and angle measurement without a retro-reflector, a prism surveying function for performing distance measurement and angle measurement with respect to the retro-reflector, and a tracking function for tracking the retro-reflector and for performing distance measurement and angle measurement, wherein the surveying instrument performs non-prism measurement on a scheduled flight area, the ground base station sets a safe flight area based on the results of the non-prism measurement, and controls so that the flying vehicle system flies in the safe flight area based on the results of tracking measurement by the surveying instrument. As a result, even under a condition where position measurement by a GPS cannot be performed, it is possible to carry out a flight control of the air vehicle system.

Further, according to the present invention, in the flying vehicle guiding system, the surveying instrument acquires the results of measurement as polar coordinates of a distance and a directional angle, and the ground base station controls the flying vehicle system based on the polar coordinates. As a result, data processing for the control can be simplified, the vehicle can be operated linearly from the flight starting point to the measurement starting point, and high-speed flight becomes possible.

Further, according to the present invention, in the flying vehicle guiding system, the flying vehicle system comprises a GPS unit, wherein the ground base station controls the flight of the flying vehicle system based on either a positional information of de flying vehicle system acquired by the surveying instrument or a positional information of the flying vehicle system acquired by the GPS unit. As a result, the flight control of the air vehicle system under at least one of the condition where positional measurement can be carried out by a GPS or under the condition where positional measurement can be carried out by the surveying instrument, and it becomes possible to carry out the flight control under various conditions.

Further, according to the present invention, in the flying vehicle guiding system, two or more of the surveying instruments are set place at different positions, wherein the ground base station commonly owns measurement results of the flying vehicle system by two or more of the surveying instruments, wherein the flight of the flying vehicle system is controlled based on a measurement data by the surveying instruments set place at positions where the surveying instruments can measure the flying vehicle system. As a result, it becomes possible to carry out the flight control by the surveying instrument at complicated places where the conditions cannot be identified by a single surveying instrument, or under a condition where a blind spot exists.

Further, according to the present invention, in the flying vehicle guiding system, the ground base station converts a polar coordinate data from the surveying instrument to an orthogonal coordinate data measured by the GPS unit, and controls the flight of the flying vehicle system based on the orthogonal coordinate data. As a result, flight control of a flying vehicle becomes possible by positional measurement of the surveying instrument using an already existing flying vehicle system where the GPS unit is installed.

Further, according to the present invention, in the flying vehicle guiding system, the flying vehicle system comprises a camera tiltably supported in an arbitrary direction via a gimbal, and the retro-reflector tilted integrally with the camera and provided in a relation already known with the camera. Thus, it is possible to specify the position of the camera based on the measurement results by the surveying instrument, and the image processing in photogrammetry becomes easy.

Further, according to the present invention, the flying vehicle guiding method uses a remotely controllable flying vehicle system, and a surveying instrument which can perform a non-prism measurement and a tracking measurement, wherein the flying vehicle guiding method comprises a step of measuring the flight area by non-prism measurement in advance, a step of setting a safe flight area based on the results of preliminary measurement, and a step of remotely controlling the flying vehicle system so as to fly within the safe flight area. As a result, it becomes possible to operate the flying vehicle safely without making contact with an object to be measured or with an obstacle.

BRIEF DESCRIPTION OF THE DRAWINGS

FIG. 7 are explanatory drawings to show the procedure of a flying vehicle guidance according to the present embodiment.

DETAILED DESCRIPTION OF THE PREFERRED EMBODIMENTS

Description will be given below on embodiments of the present invention by referring to the attached drawings.

Figure 1:
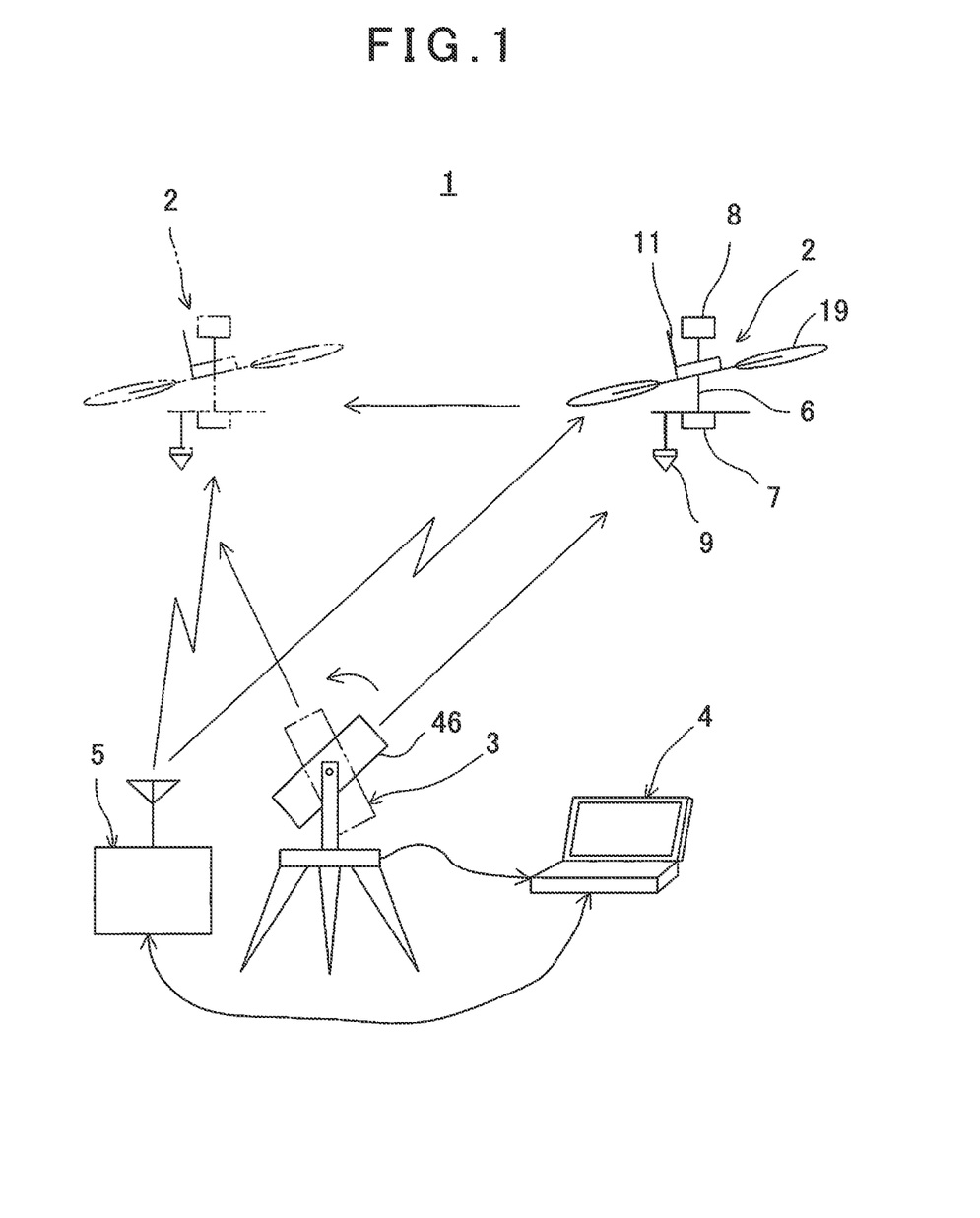
FIG. 1 is a drawing to show an arrangement of a flying vehicle guiding system according to a present embodiment.

First, referring to FIG. 1, a description will be given on a flying vehicle guiding system 1 according to the present embodiment.

The flying vehicle guiding system 1 primarily comprises an air vehicle system (UAV) 2, a surveying instrument 3, a ground base station 4, and a remote controller 5.

The flying vehicle system 2 primarily comprises a flying vehicle 15 (to be described later), a shaft 6 as a supporting member vertically supported on the flying vehicle 15 via a gimbal mechanism, a lower camera 7 and an upper camera 8 disposed at a lower end and at an upper end of the shaft 6 respectively, a prism 9 as a retro-reflector installed at a lower end of the shaft 6 integrated with the lower camera 7, and a flying vehicle communication unit 11 to communicate with the ground base station 4. It is to be noted that an optical axis of the lower camera 7 and the upper camera 8 coincides with a center line of the shaft 6 and are provided so as to be vertical at all times. An optical axis of the prism 9 is also set so as to be vertical, and the positional relations between the prism 9 and the lower camera 7 and the upper camera 8 are already known. It would suffice if the optical axis of the lower camera 7, the upper camera 8, and the prism 9 run so as to be vertical, and the center line of the shaft 6 is not necessarily set in vertical.

The prism 9 is installed so that the prism 9 faces in downward direction and has an optical characteristic to retro-reflect light entering from the entire ranges below the prism 9. Further, instead of the prism 9, a reflection seal may be provided at a predetermined position of the shaft 6.

The surveying instrument 3 can carry out distance measurement by prism measurement (i.e. measurement using a prism or a retro-reflector as an object of measurement) and by non-prism measurement (i.e. measurement not using a prism or a retro-reflector) and can also measure a horizontal angle and a vertical angle. Further, the surveying instrument 3 has a tracking function. The surveying instrument 3 is set place at a known point, and carry out non-prism measurement on a flight area as planned. Further, when the flying vehicle system 2 is flying, the surveying instrument 3 tracks the prism 9 and measures three-dimensional coordinates of the prism 9. The surveying instrument 3 is electrically connected to the ground base station 4 by wired or non-wired means, and the three-dimensional coordinates thus measured are inputted to the ground base station 4 as coordinate data.

The ground base station 4 is a personal computer (PC), for instance, and has an arithmetic unit having an arithmetic function, a storage unit where data and programs are stored, and further, has a base communication unit. The base communication unit can perform communication to and from the remote controller 5. Further, the ground base station 4 sets up a flight safety range based on the non-prism measurement, and transmits control data with respect to the flight area to the remote controller 5 so that the flying vehicle system 2 can be remotely controlled within the flight safety range.

The remote controller 5 remotely controls the flight of the flying vehicle system 2 and can perform wireless communication between the surveying instrument 3 and the flying vehicle communication unit 11. In a case where a flight area restriction data with respect to the flight area is transmitted from the ground base station 4, a flight control signal transmitted from the remote controller 5 is restricted by the flight area restriction data, and the flying vehicle system 2 is controlled so as to fly within the flight safety range. Further, by the remote controller 5, shutters of the lower camera 7 and the upper camera 8 can be remotely controlled.

Figure 2A:
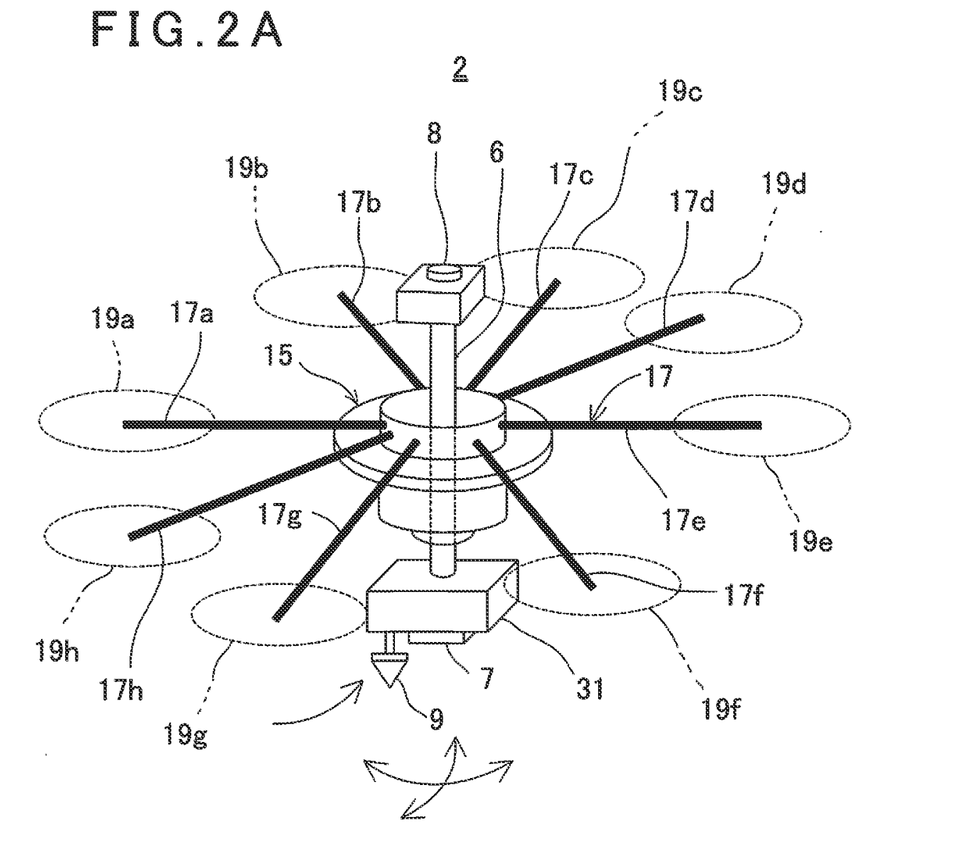
FIG. 2A is a perspective view of a flying vehicle system according to the present embodiment.

Next, by referring to FIG. 2 and FIG. 3, description will be given on the flying vehicle system 2.

The flying vehicle 15 has a plurality of and even numbers of propeller frames 17 extending in radial direction, and a propeller unit is mounted on a forward end of each of the propeller frames 17. The propeller unit comprises a propeller motor 18 disposed at a forward end of the propeller frame 17, and propellers 19 (19a to 19h in the figure) are mounted on an output shaft of the propeller motor 18. The propellers 19 are rotated by the propeller motor 18 and the flying vehicle 15 can fly.

The flying vehicle 15 has a main frame 21 in hollow and cylindrical shape at its center. An outer flange 22 extending in an outward direction is provided on an upper end of the main frame 21, and an inner flange 23 extending toward the center is provided on a lower end of the main frame 21. At the central portion of the inner flange 23, a circular hole 24 is formed.

The propeller frame 17 is designed in form of a rod. The propeller frame is disposed within a plane, which perpendicularly cross the center line of the main frame 21, and a predetermined number of propeller frames (at least 4 propeller frames, preferably 8 propeller frames; in the figure, 8 propeller frames (17a to 17h) are shown) are provided in a horizontal direction and with an equal angular interval. Internal end portion of the propeller frame 17 penetrates the main frame 21 and is fixed on the outer flange 22.

The shaft 6 is provided so as to penetrate the main frame 21 in up-and-down direction, the shaft 6 is supported by a gimbal 25 so as to run in vertical direction, and the gimbal 25 is mounted on the inner flange 23 via a vibration-proof member 26.

The gimbal 25 has swing shafts 27a and 27b, which perpendicularly cross in two directions, and the gimbal 25 movably supports the shaft 6 in two directions perpendicularly crossing each other. The vibration-proof member 26 absorbs a vibration caused by rotation of the propeller motor 18 and the propeller 19 and the vibration-proof member 26 is designed so than the vibration will not be transferred to the shaft 6.

A tilt sensor 28 is provided on a lower end of the shaft 6, and detects tilting of the shaft 6 caused by the change of the flying condition of the flying vehicle 15. Further, the tilt sensor 28 detects an angle between the vertical line and the center line of the shaft 6 when the shaft 6 is tilted with respect to the vertical line, and a detection result of the tilt sensor 28 is transmitted to a control unit 35 (see FIG. 4), which will be described later.

A direction angle sensor 29 is provided at a position as required of the main frame 21, and the direction angle sensor 29 detects a direction of the flying vehicle 15. The direction of the flying vehicle 15 is the direction of the flying vehicle with reference to a position where the surveying instrument 3 is set place, for instance. Further, as the direction angle sensor 29, a magnetic compass is used, or the one as shown in FIG. 2B is used.

Figure 2B:
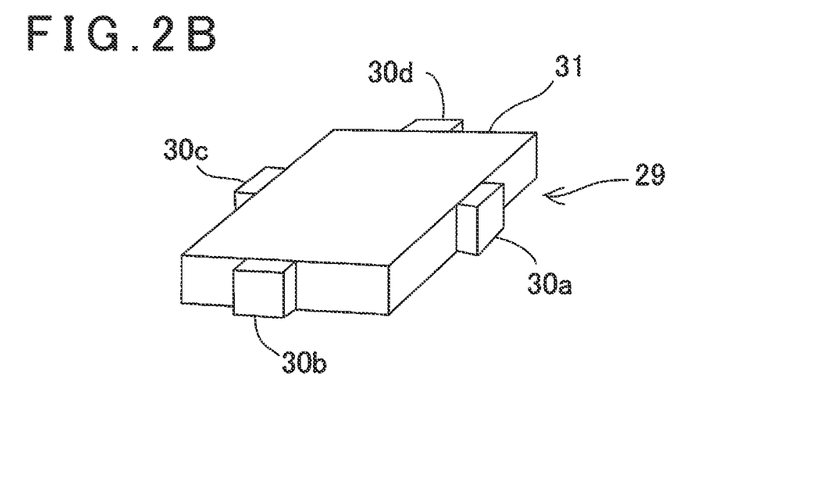
FIG. 2B is a perspective view to show one example of a direction angle sensor.
Figure 3:
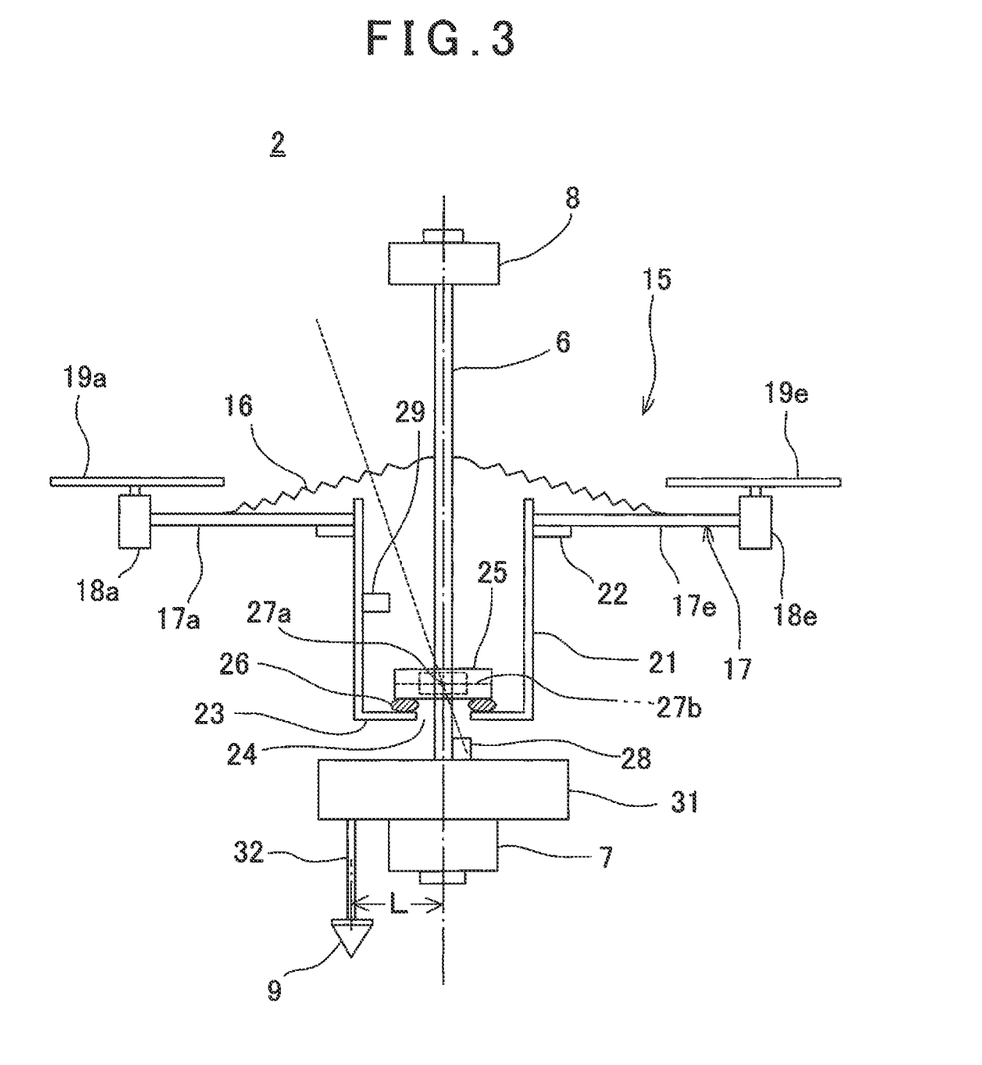
FIG. 3 is a cross-sectional view of a flying vehicle system.

FIG. 2B shows a case where the direction angle sensor 29 is provided on a control box 31 (to be described later). The direction angle sensor 29 is described briefly as follows: Photodetection sensors 30a, 30b, 30c and 30d are provided on four side surfaces of the control box 31 respectively, and it is so designed that a photodetection signal is issued when one or two of the photodetection sensors 30a, 30b, 30c, and 30d receives a distance measuring light emitted from the surveying instrument 3 or a tracking light used for tracking. Thereby, the direction of the flying vehicle system 2 with respect to the surveying instrument 3 is detected depending on which position the photodetection sensors 30a, 30b, 30c and 30d receives the distance measuring light.

On the lower end of the shaft 6, the control box 31 is provided. Inside the control box 31, the control unit 35 is accommodated. The lower camera 7 is disposed on the lower surface of the control box 31, a prism rod 32 is vertically arranged at a position separated from the lower camera 7 by a known distance L, and the prism 9 is disposed on the lower end of the prism rod 32. Further, an optical center of the prism 9 and an optical center of the lower camera 7 (e.g. the center of an image pickup element) is already known.

On the upper end of the shaft 6, the upper camera 8 is disposed. The optical axis of the upper camera 8 and the optical axis of the lower camera 7 coincide with the center line of the shaft 6, and an optical axis of the prism 9 runs in parallel to the center line of the shaft 6. The lower camera 7 photographs in vertically downward direction, and the upper camera 8 photographs in vertically upward direction. An optical center of the upper camera 8 and the optical center of the lower camera 7 are already known.

The control box 31, the lower camera 7, the prism 9, etc. fulfill functions as a balance weight, and under the condition were no external force is applied on the shaft 6, i.e. under a free condition, weight balance of the control box 31, the lower camera 7, and the prism 9 is set in such a manner that the shaft 6 is kept in vertical condition.

A balance supporting member may not particularly have to be provided when the shaft 6 can be sufficiently maintained in a vertical position by the balance weight functions of the control box 31, the lower camera 7, the prism 9, etc., but the balance supporting member may be provided in order to maintain the shaft 6 in vertical position, and so that the shaft 6 can be promptly restored to a vertical condition in a case where the shaft 6 is suddenly tilted (in a case where the posture of the flying vehicle 15 rapidly changes).

In the example as given below, description will be given below on a case where a damper spring 16 is provided as a balance supporting member.

A damper spring 16 is stretched over between the propeller frame 17 and the shaft 6. At least three damper springs 16, or more preferably, four damper springs 16 are provided, and it is preferable that the damper springs 16 is mounted between each of the propeller frames 17 extending in parallel to the swing shafts 27a and 27b and the shaft 6.

Further, each of the four damper springs 16 applies tensile force between the shaft 6 and the propeller frame 17 respectively so that the shaft 6 can maintain the vertical condition by the balancing of the tensile forces when the flying vehicle 15 takes horizontal posture (i.e. a condition where the propeller frames 17 are in horizontal condition). Further, the tensile force and a spring constant of the damper spring 16 is set to a smaller value so that the shaft 6 is directed in vertical direction due so the gravitational force when the flying vehicle 15 is tilted.

The damper spring 16 is a biasing means to apply biasing force on the shaft 6 to be maintained in vertical condition. When the shaft 6 is moved or vibrated, the damper spring 16 promptly restores the shaft 6 so a vertical condition and makes vibration attenuated. Further, as the biasing means, a torsion coil spring for rotating in a returning direction may be used to rotate the swing shafts 27a and 27b when the swing shafts 27a and 27b of the gimbal 25 are rotated in addition to the damper spring 16 as described above.

Figure 4:
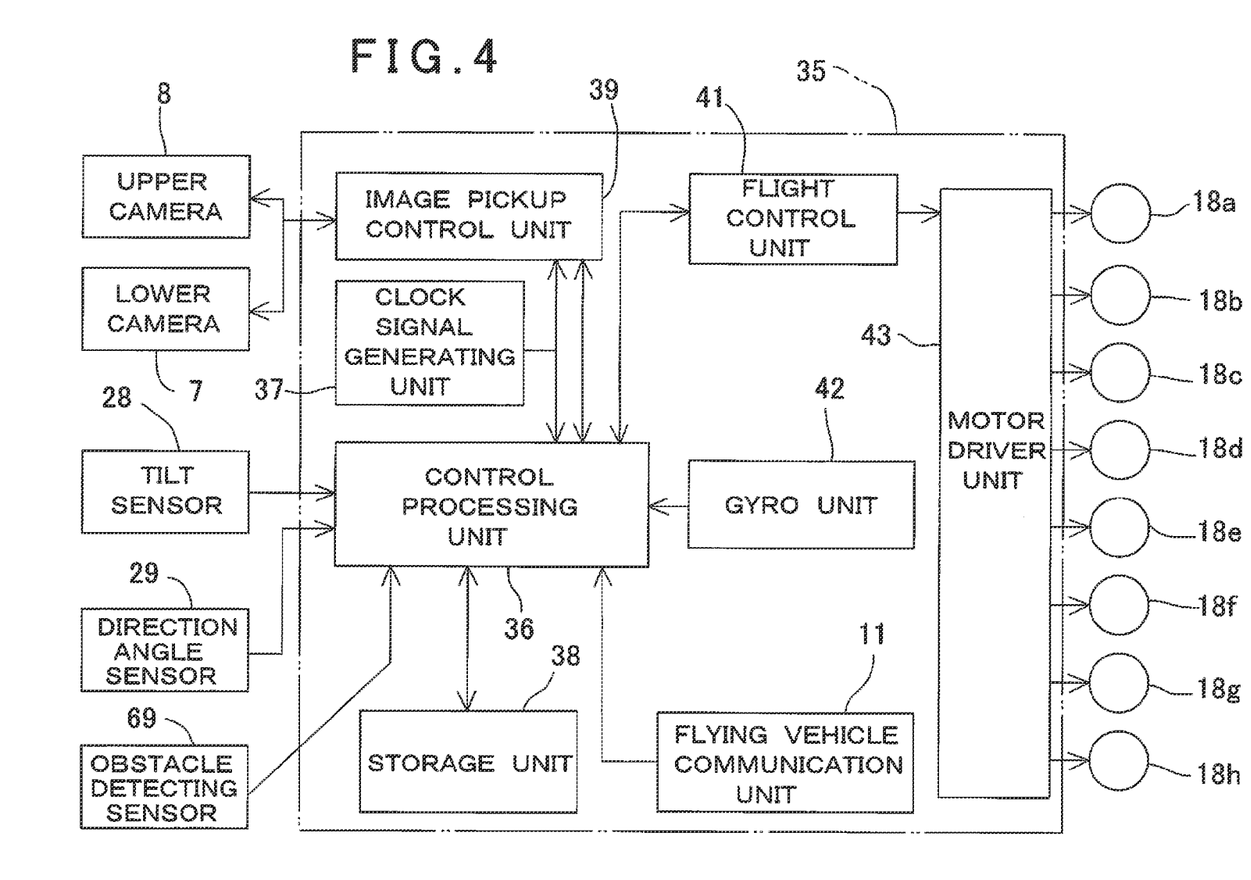
FIG. 4 is a block diagram of a control system of the flying vehicle system.

By referring to FIG. 4, description will be given on a control system of the flying vehicle system 2.

Inside the control box 31, the control unit 35 is accommodated.

The control unit 35 primarily comprises a control processing unit 36, a clock signal generating unit 37, a storage unit 38, an image pickup control unit 39, a flight control unit 41, a gyro unit 42, a motor driver unit 43, and a flying vehicle communication unit 11.

The photographings of the lower camera 7 and the upper camera 8 are controlled by the image pickup control unit 39. Further, the images taken by the lower camera 7 and the upper camera 8 are inputted to the image pickup control unit 39 as image data.

As the lower camera 7 and the upper camera 8, digital cameras are used and still images can be photographed, and video images can also be taken. Further, as an image pickup element, a CCD or CMOS sensor, etc., each being an aggregate of pixels, is used, and a position of each pixel can be specified in the image pickup element. For instance, the position of each pixel can be specified by orthogonal coordinates, which have the point where the optical axis of the camera of the image pickup element passes through (the center of the image pickup element) as an origin point.

As described above, the optical axis of each of the lower camera 7 and the upper camera 8 coincides with the center line of the shaft 6, and the optical axis of the prism 9 runs in parallel to the center line of the shaft 6. Further, the optical axis of the prism 9 is in a positional relation already known with the optical axis of the lower camera 7.

In the storage unit 38, a program storage area and a data storage area are formed. In the program storage area, the following programs are stored: a photographing program for controlling photographing operations of the lower camera 7 and the upper camera 8, a flight control program for driving and controlling the propeller motor 18, a communication program for transmitting the acquired data to the ground base station 4 and for receiving a flight command and the like from the remote controller 5, a data processing program for processing and storing the data obtained by the lower camera 7 and the upper camera 8, an image tracking program for performing the tracking by using video images, and other programs.

In the data storage unit, still image data, and video image data, etc. as acquired by the lower camera 7 and the upper camera 8 are stored.

Based on control signals issued from the control processing unit 36, the image pickup control unit 39 carries out controlling with resspect to the photographing operation of the lower camera 7 and the upper camera 8. The modes of the control include: selecting of the camera to be used depending on the object to be measured, synchronous controlling of the lower camera 7 and the upper camera 8, and controlling to acquire still images at a predetermined time interval while acquiring video images, and the like. For the lower camera 7 and the upper camera 8, the time of photographing is controlled or synchronously controlled according to clock signals issued from the clock signal generating unit 37.

The direction angle sensor 29 detects the direction of the flying vehicle 15 and inputs a detection result to the control processing unit 36. The gyro unit 42 detects a posture of the flying vehicle 15 under flight condition and inputs a detection result to the control processing unit 36.

The flying vehicle communication unit 11 receives a maneuvering signal from the remote controller 5 in a case where the flight of the flying vehicle 15 is remotely controlled by the remote controller 5 and inputs the maneuvering signal to the control processing unit 36. Or, the flying vehicle communication unit 11 has a function such as transmitting the image data photographed by the lower camera 7 and the upper camera 8 to the ground base station 4 on the ground side together with the photographing time.

The control processing unit 36 executes the control necessary for acquiring the images according to the required programs stored in the storage unit 38. Further, the control processing unit 36 calculates a control signal relating to the flight based on the control signal and on the detection results of the gyro unit 42, and outputs the control signals so the flight control unit 41.

When the control signal relating to the flight is inputted from the control processing unit 36, the flight control unit 41 drives the propeller motor 18 to a condition as required via the motor driver unit 43 based on the control signal.

Figure 5:
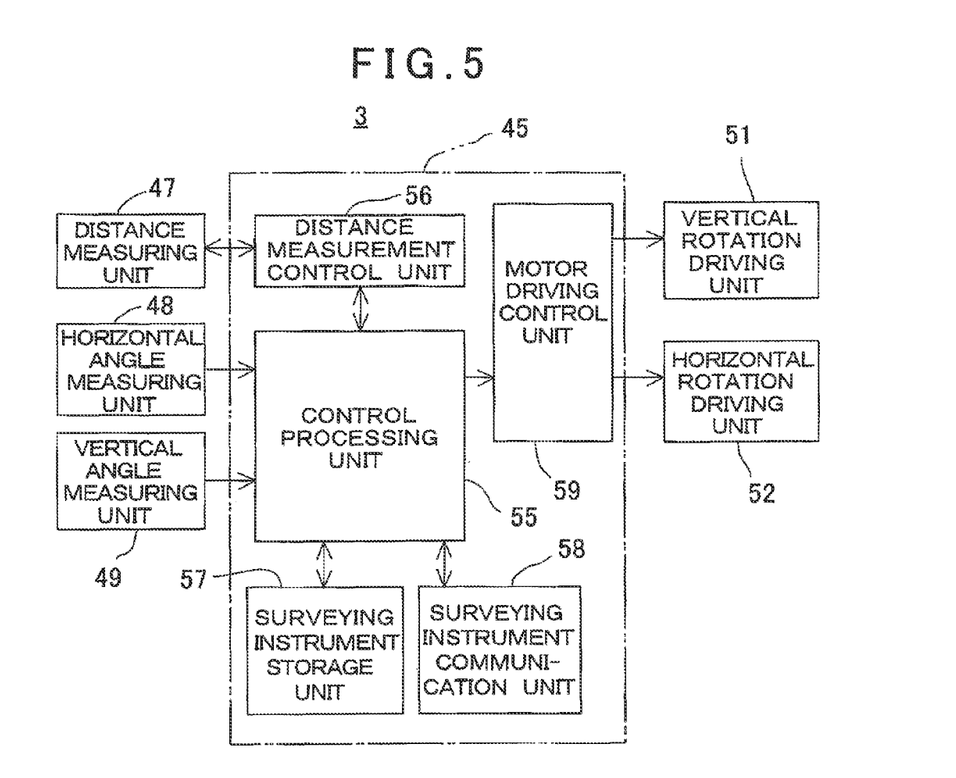
FIG. 5 is a schematical block diagram to show one example of a surveying instrument according to the present embodiment.

By referring to FIG. 5, description will be given on the surveying instrument 3.

The surveying instrument 3 primarily comprises a surveying instrument control unit 45, a telescope unit 46 (see FIG. 1), a distance measuring unit 47, a horizontal angle measuring unit 48, a vertical angle measuring unit 49, a vertical rotation driving unit 51, a horizontal rotation driving unit 52, etc.

The telescope unit 46 is to sight an object to be measured. The distance measuring unit 47 is to project a distance measuring light via the telescope unit 46, and further receives a reflection light from the object to be measured via the telescope unit 46 and carry out distance measurement. Further, the distance measuring unit 47 can measure a distance to the object to be measured by one of the following three modes: as a measuring mode, a non-prism measurement mode, a prism measurement mode, and a tracking measurement mode for tracking an object to be measured (prism) while performing prism measurement.

The horizontal angle measuring unit 48 detects a horizontal anglers the sighting direction of the telescope unit 46, and the vertical angle measuring unit 49 detects a vertical angle in the sighting direction of the telescope unit 46. The detection results of the horizontal angle measuring unit 48 and the vertical angle measuring unit 49 are inputted to the surveying instrument control unit 45.

The surveying instrument control unit 45 primarily comprises an control processing unit 55, a distance measurement control unit 56, a surveying instrument storage unit 57, a surveying instrument communication unit 58, a motor driving control unit 59, etc.

It is designed so that the following programs and the like are stored in the surveying instrument storage unit 57, a measurement program for performing distance measurement by each modes of the non-prism measurement mode, the prism measurement mode, and the tracking measurement mode, a communication program and the like for performing communication to and from the flying vehicle system 2 and the ground base station 4, and further the measurement results of the object to be measured (distance measurement, angle measurement) are stored.

Based on the measurement mode selecting command from the control processing unit 55, the distance measurement control unit 56 determines as to which of the modes, the non-prism measurement mode, the prism measurement mode, and the tracking measurement mode, should be adopted for the execution of the measurement, and controls the distance measurement control unit 56 according no the mode as determined.

The motor driving control unit 59 controls the vertical rotation driving unit 51 and the horizontal rotation driving unit 52 in order to sight the telescope unit 46 to the object to be measured, or in order to track the object to be measured, and rotates the telescope unit 46 in vertical direction or in horizontal direction.

The surveying instrument communication unit 58 transmits the results (three-dimensional position of the prism 9), which is measured about the object to be measured (the prism 9) tracking measurement mode, in real time to the ground base station 4.

Figure 6:
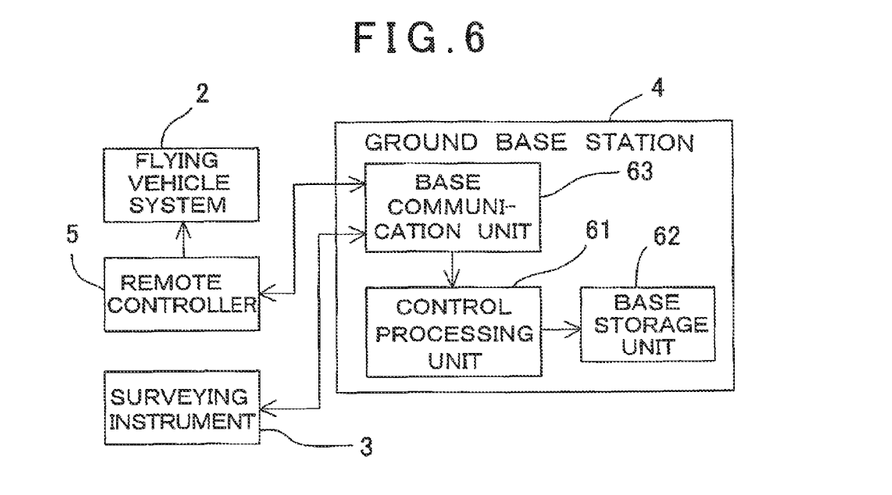
FIG. 6 is a block diagram to show an approximate arrangement of a ground base station according to the present embodiment, and to show the relation of the flying vehicle system, the surveying instrument, the ground base station, and a remotely controlled vehicle.

FIG. 6 shows an approximate arrangement of the ground base station 4 and the relation of the flying vehicle system 2, the surveying instrument 3, the ground base station 4, and the remote controller 5.

The ground base station 4 has an control processing unit 61, a base storage unit 62, and further, a base communication unit 63.

Inc control processing unit 61 has a clock signal generating unit, associates an image data, a shutter time data, and a coordinate data, as received via the remote controller 5, with a clock signal respectively, processes as time series data based on the clock signal, and stores in the base storage unit 62.

In the base storage unit 62, various types of programs are stored: a flight plan preparing program for preparing a flight plan such as the setting up of a flight area based on map information obtained via the Internet or the like, a flight area calculating program for calculating the flight safety range of the flying vehicle system 2 according to the flight plan and preliminary measurement data obtained by the surveying instrument 3, a flight control program for preparing a flight control data based on the flight safety range and for controlling the flight of the flying vehicle system 2, a calculation program necessary for photogrammetry, a communication program for performing data communication between the remote controller 5 and the surveying instrument 3, etc., and further, various types of data such as images acquired by the flying vehicle system 2, measurement data measured by the surveying instrument 3 (coordinate data), etc. are stored.

The base communication unit 63 performs wired communication or wireless communication between the ground base station 4 and the remote controller 5.

By referring to FIG. 7 and FIG. 8, description will be given on general features of the operation of the flying vehicle guiding system 1.

(Step 01) The surveying instrument 3 is set up at a place of measurement operation and this position is used as a reference position. The measurement mode is set to the non-prism measurement mode, and non-prism measurement (preliminary measurement) is carried out on an object to be measured 65 and on obstacles (see FIG. 7A and FIG. 7C).

(Step 02) Measurement data of the non-prism measurement is transmitted to the ground base station 4, and in the ground base station 4, the safe flight area is calculated based on the measurement data. Here, the sale flight area is defined as the range where no approach is made within 2 to 3 meters from the object to be measured or an obstacle, e.g. the range where no approach is made within 2 to 3 meters from building walls.

In the ground base station 4, a flight course is calculated so that the flying vehicle system 2 flies within the safe flight area, and a flight plan is calculated and is obtained, which sets points (coordinates) where images are picked up during the flight, and the like.

(Step 03) The measurement mode is changed to the tracking measurement mode, and a horizontal angle, an elevation angle and a distance are measured while tracking the flying vehicle system 2. It is to be noted that the measurement data acquired by the flying vehicle system 2 are polar coordinate data of the horizontal angle, the elevation angle and the distance, and the measurement data are stored as polar coordinates data, and the data obtained by coordinate-converting so orthogonal three-dimensional coordinate data are also stored.

(Step 04 and Step 05) Tracking measurement is performed on the flying vehicle system 2, and the flying vehicle system 2 flies toward the measurement starting point. As for the control of the flying vehicle system 2 while flying, polar coordinates are used as positional data. In a case of the tracking measurement, it is an indispensable requirement that the object to be measured (in this case, the object to be measured is the flying vehicle system 2, and the measurement position is the prism 9) is included within the visual field of the telescope unit 46. Therefore, the flying speed of the flying vehicle system 2 is limited to the speed, at which tracking by the telescope unit 46 can be made in a direction perpendicularly crossing the optical axis of the telescope unit 46. On the other hand, as for the moving of the telescope unit 46 in the direction of optical axis, the flying vehicle system 2 is included in the visual field regardless of the speed, and the moving at higher speed is possible.

Figures 7A, 7B:
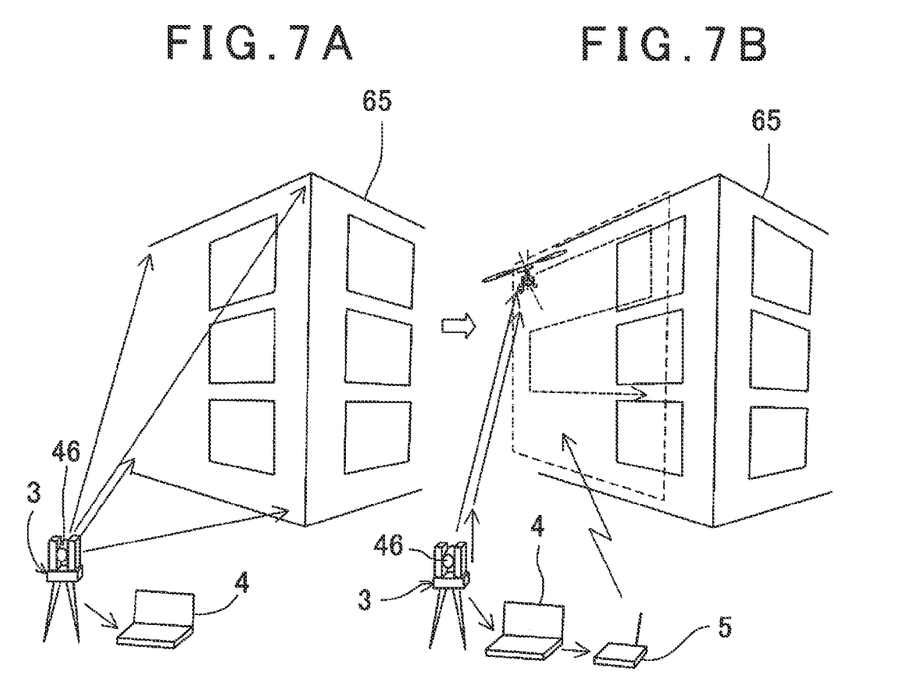
FIG. 7A shows a preliminary measurement.
FIG. 7B shows a flying vehicle tracking measurement.
Figure 7C:
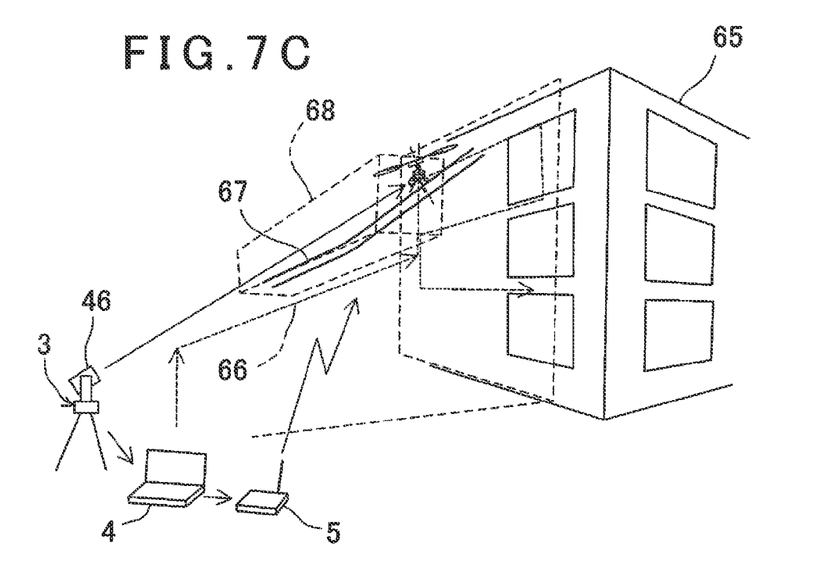
FIG. 7C shows a tracking measurement in a case where there are obstacles, respectively.
Figure 8:
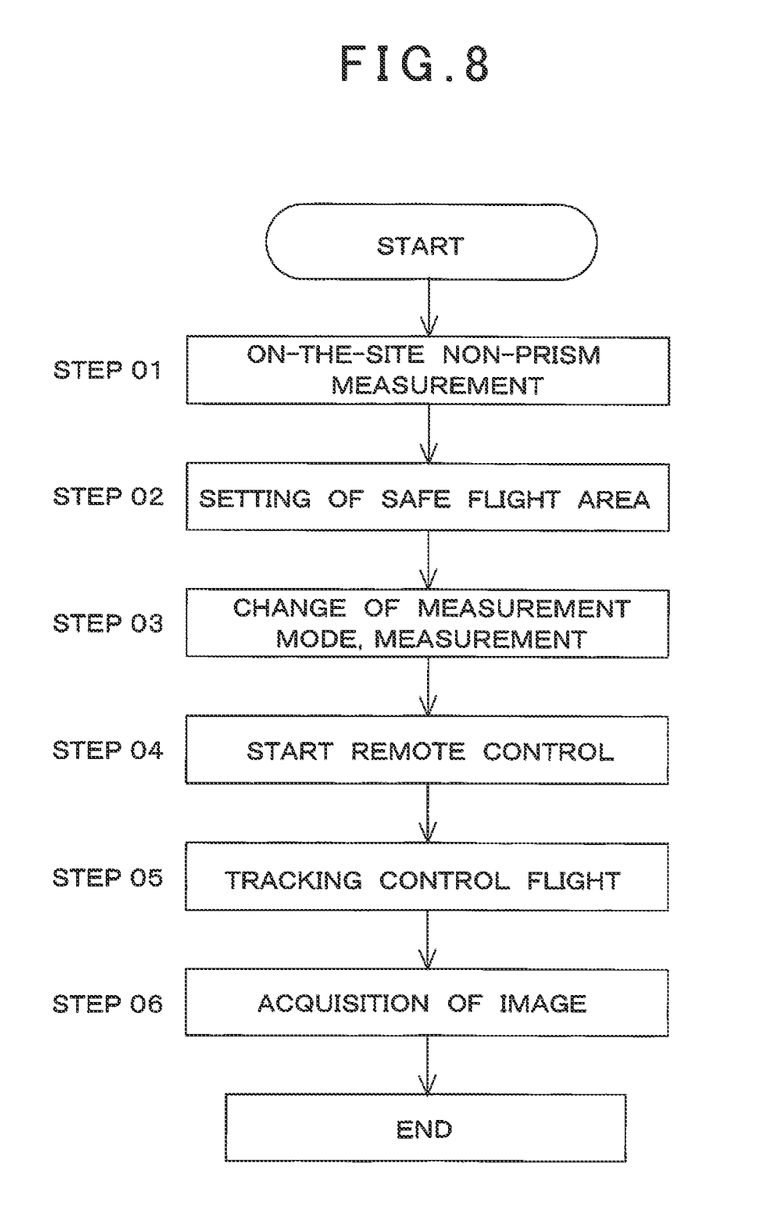
FIG. 8 is a flowchart to show an operation of the present embodiment.

Therefore, in a case where the flying vehicle system 2 is moved to a measurement starting point under the condition where the measurement starting point is sighted by the telescope unit 46, the flying vehicle system 2 can be moved to the measurement starting point at higher speed by making the flight course 66 coincide with the sighting axis of the telescope unit 46 (see FIG. 7B).

Further, in a case where there is an obstacle 67 such as an electric wire when the flying vehicle system moves from the surveying instrument 3 to the measurement starting point, the obstacle 67 is measured by preliminary measurement in Step 01, and when the safe flight area is calculated in Step 02, consideration is given to the obstacle 67. Therefore, an obstacle area 68 including the obstacle 67 is calculated, and the obstacle area 68 is excluded from the safe flight area.

Further, in a case where the surveying instrument 3 sights the measurement starting point, when the obstacle area 68 exists in the sighting direction, the surveying instrument 3 sights the direction where the obstacle area 68 is excluded. The flight course 66 runs along the sighting axis excluding the obstacle area 68, and it is set up in such manner that the flying vehicle system flies toward the measurement starting point at a position beyond the obstacle area 68 (see FIG. 7C).

When the flying vehicle system 2 reaches at the measurement starting point, the flying vehicle system 2 starts the flight within the safe flight area according to the flight plan. The present position (coordinates) of the flying vehicle system 2 is measured by the surveying instrument 3. The present positional data are transmitted from the surveying instrument 3 to the ground base station 4 in real time, the present positional data are compared with the positional data of the Flight plan at the ground base station 4, a deviation of both positional data is obtained, and a flight control data is prepared based on the deviation. The flight control data is transmitted to the flying vehicle system 2 via the remote controller 5, and the flying vehicle system 2 is controlled so as to be a flight along the flight plan based on the flight control data.

(Step 06) In the flying process, still images are acquired by the lower camera 7 and/or the upper camera 8 at positions as set in the flight plan.

Still images are transmitted to the ground base station 4 via the remote controller 5 and are stored at the ground base station 4. At the ground base station 4, a condition of the object to be measured is judged based on the still image, or photogrammetry is carried out based on the still images.

As described above, in a case where obstacle exists, the obstacle region 68 is set up in advance. Also, other safety system may be further provided.

Figure 9:
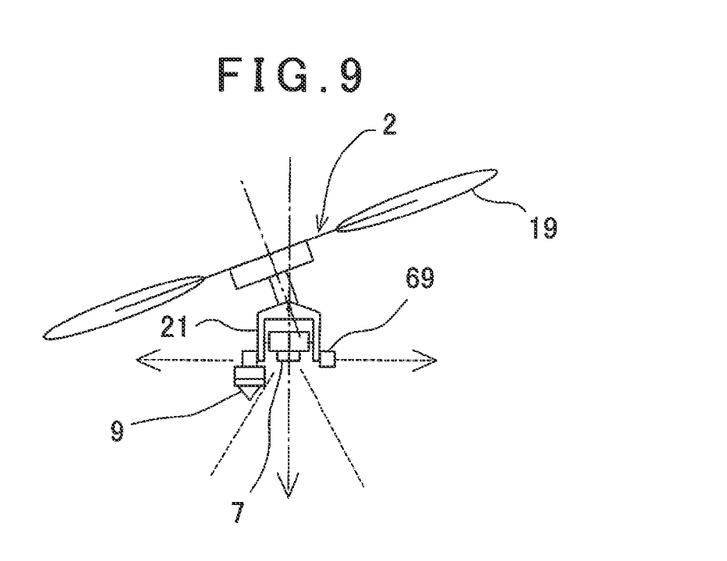
FIG. 9 is a perspective view to show a case where an obstacle detecting sensor is provided on the flying vehicle system.

As shown in FIG. 9, an obstacle detecting sensor 69, e.g. a supersonic sensor, is provided on the main frame 21, and when the flying vehicle system 2 comes within a predetermined distance from the object (e.g. 2 meters), the obstacle detecting sensor 69 detects the obstacle, and the control unit 35 restricts the flight of the flying vehicle system 2 so as to prevent further approach.

It is to be noted that in the description as given above, the flying vehicle system 2 is operated by autonomous flight according to the flight plan, but an operator may operate the remote controller 5 and remotely control the flying vehicle system 2 manually. In this case, if the flying vehicle system 2 flies out of the safe flight area or goes under a condition where the flying vehicle system 2 enters into the obstacle area 68, priority is given on the flight restricting signal from the control unit 35 rather than the remote control signal from the remote controller 5, and contact or collision of the flying vehicle system 2 to the object to be measured 65 or to the obstacle 67 can be prevented.

Figure 10:
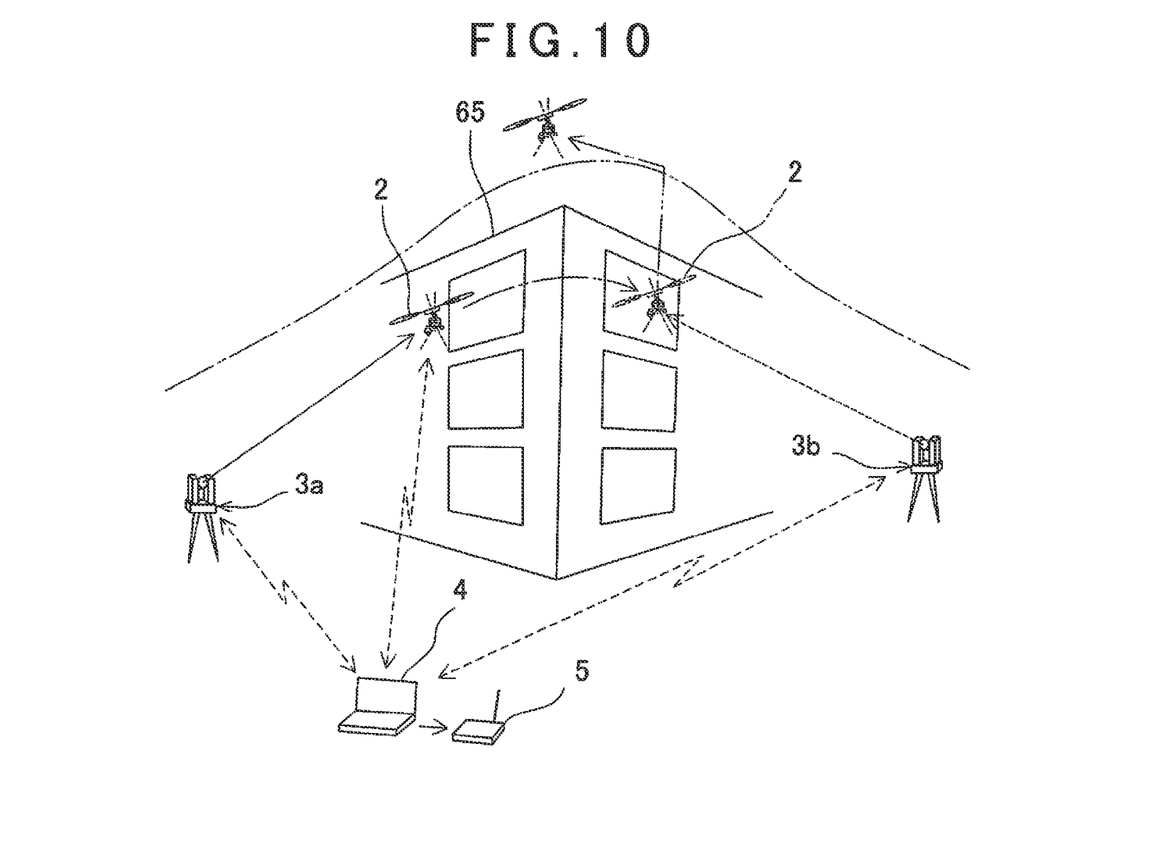
FIG. 10 is an explanatory drawing to show an application example of the present embodiment.

FIG. 10 shows an application example of the present embodiment.

In the present embodiment, because the position of the flying vehicle system 2 is measured by the surveying instrument 3, the range, where the flying vehicle system 2 can be controlled, is limited to the range where the surveying instrument 3 can sight. Therefore, as shown in FIG. 10, in a case where a surveying instrument 3a is set place in front of the object to be measured 65, the flying vehicle system 2 cannot be controlled when measuring the lateral side of the object to be measured 65. Therefore, if a surveying instrument 3b is set place on the lateral side of the object to be measured 65 and the positional information of the flying vehicle system 2 measured by the surveying instrument 3a is transmitted to the ground base station 4 at all times and the results measured by the surveying instrument 3a and the surveying instrument 3b are in common at the ground base station 4, when the position of the flying vehicle system 2 can be measured by the surveying instrument 3b, a shift to the control based on the measurement data by the surveying instrument 3b can be carried out without interruption, and this makes it possible to carry out continuous flight control of the flying vehicle system 2.

If a plurality of the surveying instruments 3 are set place so as to supplement the visual fields of each of the surveying instruments 3, flight control of the flying vehicle system 2 can be carried out in complicated places or in places of wide range.

Figure 11:
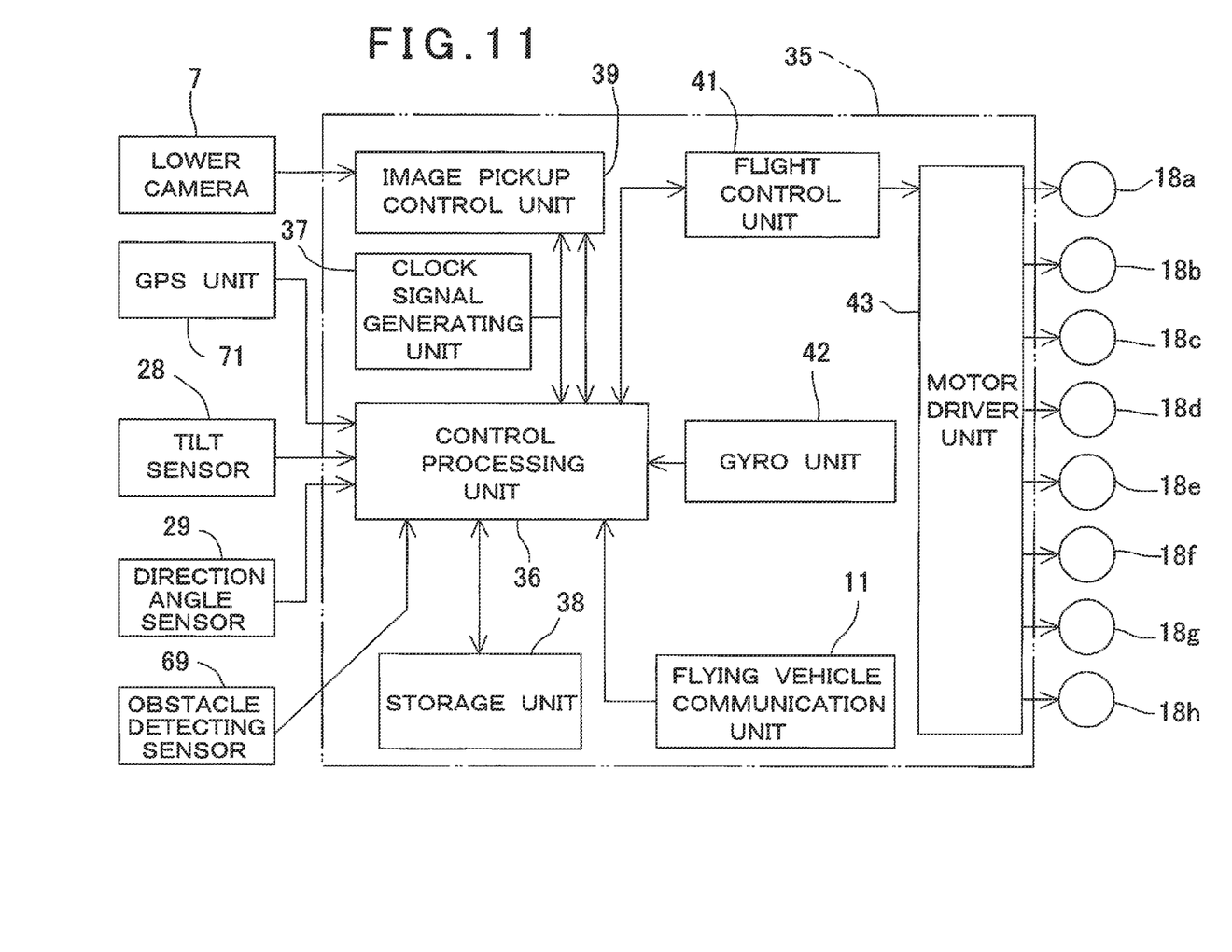
FIG. 11 is a block diagram of a control system of a flying vehicle system according to another embodiment.

FIG. 11 shows another embodiment. It is to be noted that in FIG. 11, the same component as shown in FIG. 4 is referred by the same symbol, and detailed description is not given here.

In the another embodiment, a GPS unit 71 is installed on the flying vehicle system 2, and flight control of the flying vehicle system 2 is carried out by simultaneously performing position measurement of the flying vehicle system 2 by the GPS unit 71 and the position measurement by the surveying instrument 3.

The coordinates of the surveying instruments 3a and 3b are the coordinates measured by the GPS unit 71 or the coordinates obtained from the relation of both the surveying instruments 3a and 3b and the GPS unit 71 (the results of measurement of the GPS unit 71 and the results of measurement of the surveying instruments 3a and 3b) under a condition where the GPS unit 71 and the surveying instruments 3a and 3b can be used at the same time. An upper part of FIG. 10 is an area where GPS can be used.

Instead of the upper camera 8 (see FIG. 4), the GPS unit 71 is disposed. Since on the lower end of the shaft 6, which always maintains the vertical position, a lower camera 7 is provided, and the GPS unit 71 is disposed on the upper end of the shaft 6, the position measured by the GPS unit 71 coincides with the predetermined position of the lower camera 7, e.g. the optical axis. Therefore, the position photographed by the lower camera 7 becomes a position measured by the GPS unit 71, and there is no need to correct the position measured by the GPS unit 71.

The present position of the flying vehicle system 2 measured by the GPS unit 71 is captured in the control unit 35, and is transmitted to the ground base station 4 via the flying vehicle communication unit 11. Based on the positional data of the flying vehicle system 2 measured by the surveying instrument 3 and on the positional data measured by the GPS unit 71, the ground base station 4 prepares a control data of the flying vehicle system 2, and controls the flight of the flying vehicle system 2. Further, in the present embodiment, priority is given on the positional data measured by the surveying instrument 3, and in a case where positional data of the flying vehicle system 2 cannot be obtained by the surveying instrument 3, positional data of the GPS unit 71 is used.

By using the position measurement of the flying vehicle system 2 by the GPS unit 71 at the same time, even when the flying vehicle system 2 flies out of the visual field of the surveying instrument 3, the continuity of the measurement can be carried out without interruption, and further, surveying can be carried out even on the range which cannot be captured by the surveying instrument 3.

Figure 12:
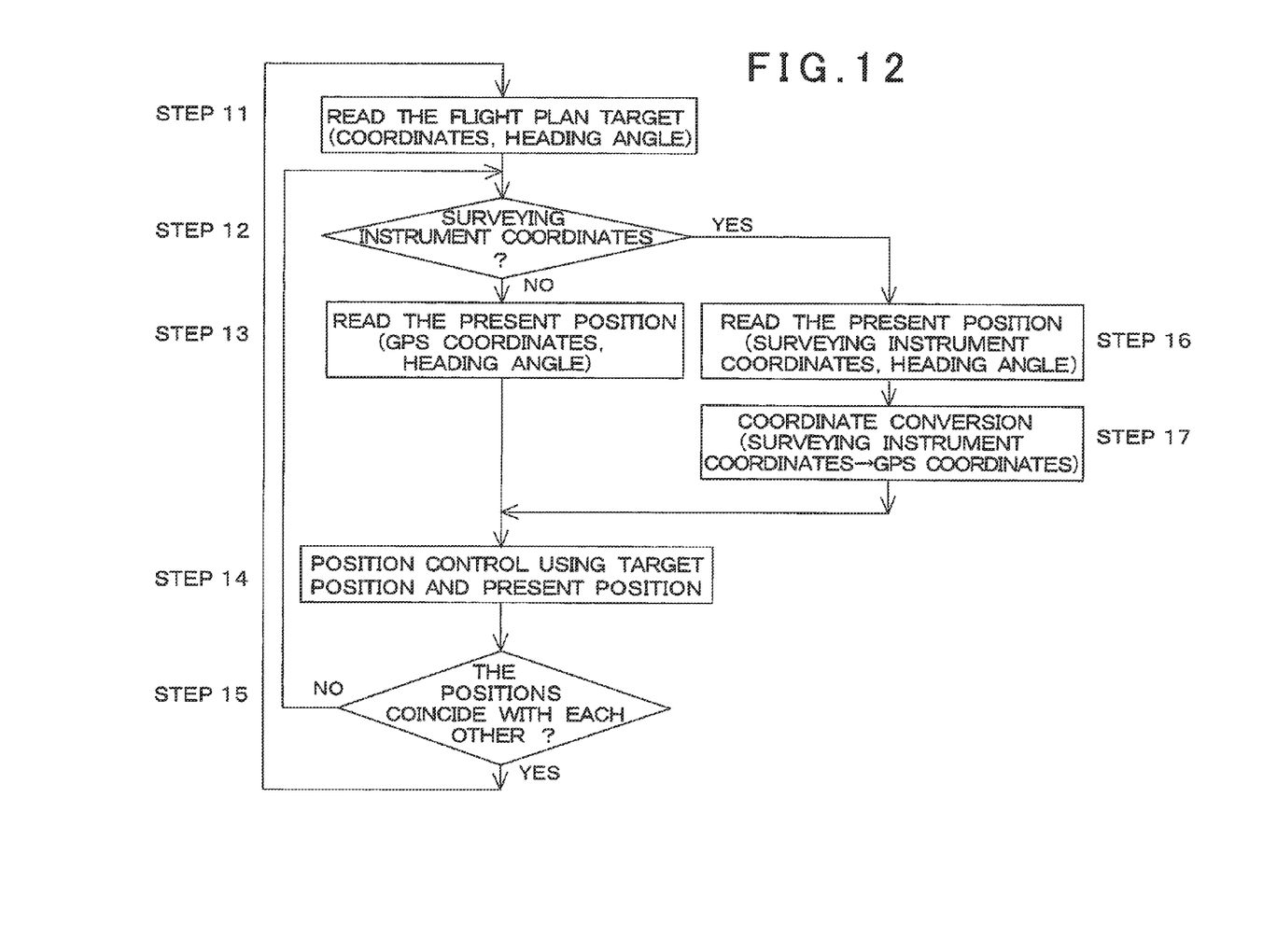
FIG. 12 is a flowchart to show an operation of the application example.

FIG. 12 shows one example of signal processing in a case where both the measuring position of the flying vehicle system 2 by the GPS unit 71 and the measuring position of the flying vehicle system 2 by the surveying instrument 3 are simultaneously used.

(Step 11) The present planned target positional data (coordinates, heading angle (direction of the main unit)) of the flying vehicle system 2 is obtained from the flight plan.

(Step 12) It is judged whether the data obtained at present is the data measured by the surveying instrument 3 or the data acquired by the GPS unit 71. It is to be noted that if it is under a condition where the data are obtained from both the surveying instrument 3 and the GPS unit 71, priority is given on the data measured by the surveying instrument 3.

(Step 13) If the data acquired in Step 12 is the data from the GPS unit 71, a positional data (data such as coordinates, heading angle (direction of the main unit), etc.) of the flying vehicle system 2, as measured by the GPS unit 71, are read.

(Step 14) The ground base station 4 compares the positional data thus read with the present planned target positional data. Then, based on the results of comparison, control data are transmitted to the flying vehicle system 2, and the flight is controlled.

(Step 15) The procedure of Step 12 to Step 15 is repeated until the present positional data as read in the result of comparison coincides with the planned target positional data are read out. If the results coincide, the next planned target positional data are read, and the procedure from Step 12 to Step 15 is repeatedly carried out, and the flight of the flying vehicle system is continuously controlled.

(Step 16 and Step 17) If the positional data acquired in Step 12 is judged as the data measured by the surveying instrument 3, the data are converted to orthogonal coordinates because the data are polar coordinates (surveying instrument coordinates→GPS coordinates).

The data measured by the surveying instrument 3 are converted to orthogonal coordinates, and the flight of the flying vehicle system 2 is controlled. By coordinate-converting the data measured by the surveying instrument 3, the flight of the flying vehicle system 2 can be controlled by the same control system. It is to be noted that the positional data acquired by the GPS unit 71 may be converted to polar coordinates and the flight of the flying vehicle system 2 may be controlled based on the polar coordinates.

Because it is configured so that the flight of the flying vehicle system 2 is controlled (remotely controlled) based on the positional information of the flying vehicle system 2 acquired by the surveying instrument 3 and on the positional information of the flying vehicle system 2 acquired by the GPS unit 71, remote control operation can be performed in both cases, i.e. under the condition where position measurement cannot be performed by the surveying instrument 3 or under the condition where position measurement cannot be performed by the GPS unit 71. This makes it possible to perform remote control operation of the flying vehicle system 2 under various conditions.

It is to be noted that in the embodiment as described above, the flying vehicle system 2 is remotely controlled via the remote controller 5, while it may be so arranged that the ground base station 4 has the function of the remote controller 5, and the flying vehicle system 2 may be remotely controlled directly from the ground base station 4.

The invention claimed is:

1. A flying vehicle guiding system comprising, a remotely controllable flying vehicle system, a surveying instrument being able to measure distance, angle, and track, and a ground base station for controlling a flight of said flying vehicle system based on measuring results by said surveying instrument, wherein said flying vehicle system has a retro-reflector as an object to be measured, wherein said surveying instrument has a non-prism surveying function for performing distance measurement and angle measurement without a retro-reflector, a prism surveying function for performing distance measurement and angle measurement with respect to said retro-reflector, and a tracking function for tracking said retro-reflector and for performing distance measurement and angle measurement, wherein said surveying instrument performs non-prism measurement on a scheduled flight area, said ground base station sets a safe flight area based on the results of said non-prism measurement, and controls so that said flying vehicle system flies in said safe flight area based on the results of tracking measurement by said surveying instrument.

2. A flying vehicle guiding system according to claim 1, wherein said surveying instrument acquires the results of measurement as polar coordinates of a distance and a directional angle, and said ground base station controls said flying vehicle system based on said polar coordinates.

3. A flying vehicle guiding system according to claim 1, wherein said flying vehicle system comprises a GPS unit, wherein said ground base station controls the flight of said flying vehicle system based on either a positional information of said flying vehicle system acquired by said surveying instrument or a positional information of said flying vehicle system acquired by said GPS unit.

4. A flying vehicle guiding system according to claim 1, wherein two or more of said surveying instruments are set place at different positions, wherein said ground base station commonly owns measurement results of said flying vehicle system by two or more of said surveying instruments, wherein the flight of said flying vehicle system is controlled based on a measurement data by said surveying instruments set place at positions where said surveying instruments can measure said flying vehicle system.

5. A flying vehicle guiding system according to claim 3, wherein two or more of said surveying instruments are set place at different positions, wherein said ground base station commonly owns measurement results of said flying vehicle system by two or more of said surveying instruments, wherein the flight of said flying vehicle system is controlled based on a measurement data by said surveying instruments set place at positions where said surveying instruments can measure said flying vehicle system.

6. A flying vehicle guiding system according to claim 3, wherein said ground base station converts a polar coordinate data from said surveying instrument to an orthogonal coordinate data measured by said GPS unit, and controls the flight of said flying vehicle system based on said orthogonal coordinate data.

7. A flying vehicle guiding system according to claim 1, wherein said flying vehicle system comprises a camera tiltably supported in an arbitrary direction via a gimbal, and said retro-reflector tilted integrally with said camera and provided in a relation already known with said camera.

8. A flying vehicle guiding method, using a remotely controllable flying vehicle system, and a surveying instrument which can perform a non-prism measurement and a tracking measurement, wherein said flying vehicle guiding method comprises a step of measuring the flight area by non-prism measurement in advance, a step of setting a safe flight area based on the results of preliminary measurement, and a step of remotely controlling said flying vehicle system so as to fly within said safe flight area.

9. A flying vehicle guiding system according to claim 2, wherein said flying vehicle system comprises a GPS unit, wherein said ground base station controls the flight of said flying vehicle system based on either a positional information of said flying vehicle system acquired by said surveying instrument or a positional information of said flying vehicle system acquired by said GPS unit.

10. A flying vehicle guiding system according to claim 2, wherein two or more of said surveying instruments are set place at different positions, wherein said ground base station commonly owns measurement results of said flying vehicle system by two or more of said surveying instruments, wherein the flight of said flying vehicle system is controlled based on a measurement data by said surveying instruments set place at positions where said surveying instruments can measure said flying vehicle system.

11. A flying vehicle guiding system according to claim 9, wherein two or more of said surveying instruments are set place at different positions, wherein said ground base station commonly owns measurement results of said flying vehicle system by two or more of said surveying instruments, wherein the flight of said flying vehicle system is controlled based on a measurement data by said surveying instruments set place at positions where said surveying instruments can measure said flying vehicle system.

12. A flying vehicle guiding system according to claim 9, wherein said ground base station converts a polar coordinate data from said surveying instrument to an orthogonal coordinate data measured by said GPS unit, and controls the flight of said flying vehicle system based on said orthogonal coordinate data.

\* \* \* \* \*